July 29, 1969  E. B. WHITE  3,458,047
FILTER CELL
Original Filed May 22, 1964  2 Sheets-Sheet 1

Inventor.
Eugene B. White
By Lee & Lee
Attys.

July 29, 1969  E. B. WHITE  3,458,047
FILTER CELL
Original Filed May 22, 1964  2 Sheets-Sheet 2
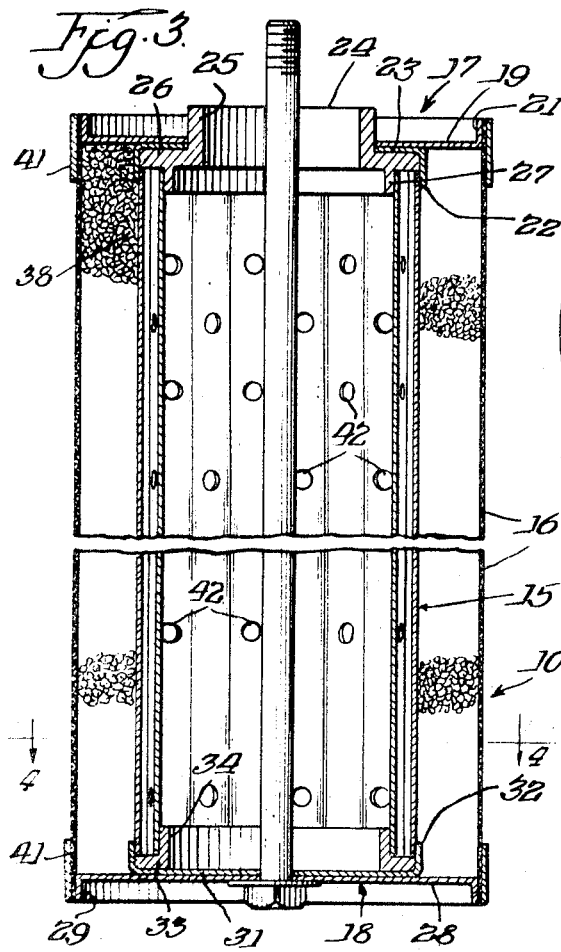
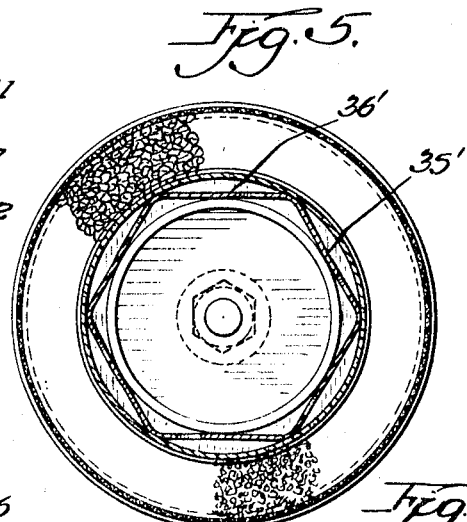
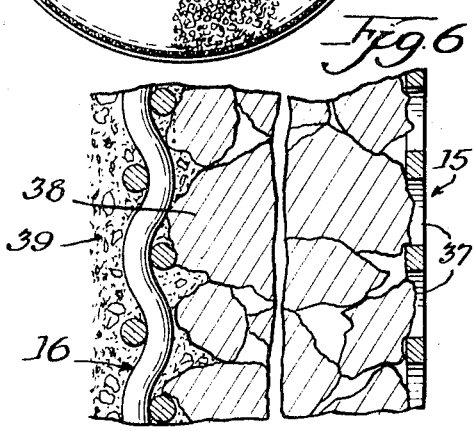
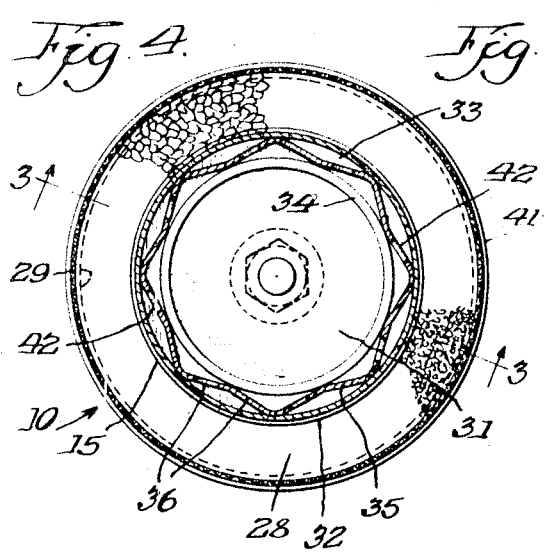
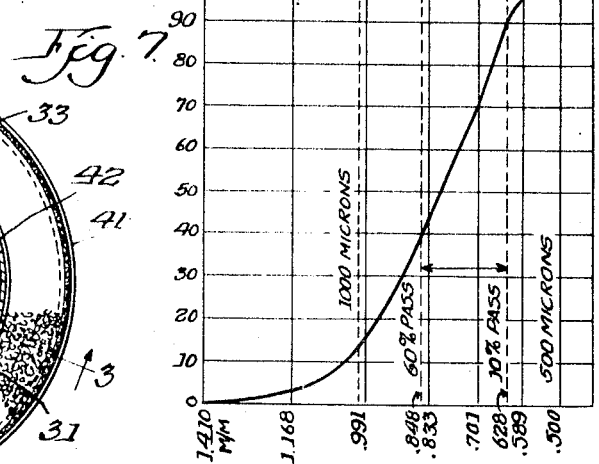
Inventor.
Eugene B. White.
By Hill & Hill
Attys.

United States Patent Office 3,458,047
Patented July 29, 1969

3,458,047
FILTER CELL
Eugene B. White, 126 S. East Ave.,
Oak Park, Ill. 60302
Continuation of application Ser. No. 369,572, May 22, 1964. This application Aug. 18, 1968, Ser. No. 758,646
Int. Cl. B01d 27/02
U.S. Cl. 210—282                                    14 Claims

ABSTRACT OF THE DISCLOSURE

A filter cell structure utilizing a non-rigid discrete material forming a direct supporting bed for a filter aid material, such discrete material retained by a suitable structure which will permit liquid flow therethrough, constructed to retain said discrete material in operative position for receiving filter aid material directly thereon but permitting relatively slight movement of said discrete material, sufficient under backwash conditions to insure substantially complete removal of filter aid material from said discrete material by such backwash.

---

This is a continuation of application Ser. No. 369,572 filed May 22, 1964, now abandoned.

The invention relates generally to filter cells for liquid filtration and more particularly to a novel filter construction for utilizing a filter aid material as the filtering medium which may be deposited on the supporting surface of the filter device and subsequently removed by a backwash operation when the filter material has reached the limits of effective filtering action under the particular operating conditions.

The invention has among its general objects the production of a filtering unit which has extremely high efficiency, with relatively low back pressure buildup, enabling its operation over extended periods of time.

Another object of the invention is the production of a filter unit having the above advantages which may be easily and efficiently backwashed, with a minimum amount of backwash liquid to remove all filter aid remaining on the unit in preparation for the next cycle of operation.

More particularly the invention has among its objects the production of a filtering unit which is very compact and has better than five times the capacity per square inch of filter area as previous filter units, thus requiring very small floor space in comparison with prior units as well as a reduction in weight and cost, at the same time providing a high rate of filtration with extremely high clarity of filtrate with a rate, for example, of five to six gallons per minute per square foot of filter area.

A further object of the invention is the production of such a filter unit which requires merely a two pipe connection and a waste connection and in which relatively very small amounts of backwash water are required.

Many other objects and advantages of the construction herein shown and described will be obvious to those skilled in the art from the disclosure herein given.

In the drawings, wherein like reference characters indicate like or corresponding parts:

FIG. 3 is an enlarged longitudinal sectional view through a filter element or cell, generally corresponding to FIG. 1 but on a considerably enlarged scale, showing the details of construction;

FIG. 4 is a transverse sectional view taken approximately on the line 4—4 of FIG. 3;

FIG. 5 is a transverse sectional view similar to FIG. 4 illustrating a modified form of construction;

FIG. 6 is a highly enlarged transverse section through the filter element illustrated in FIG. 3 disclosing the details of the screens employed; and FIG. 7 is a graph illustrating the characteristics of the material.

Figure 1:
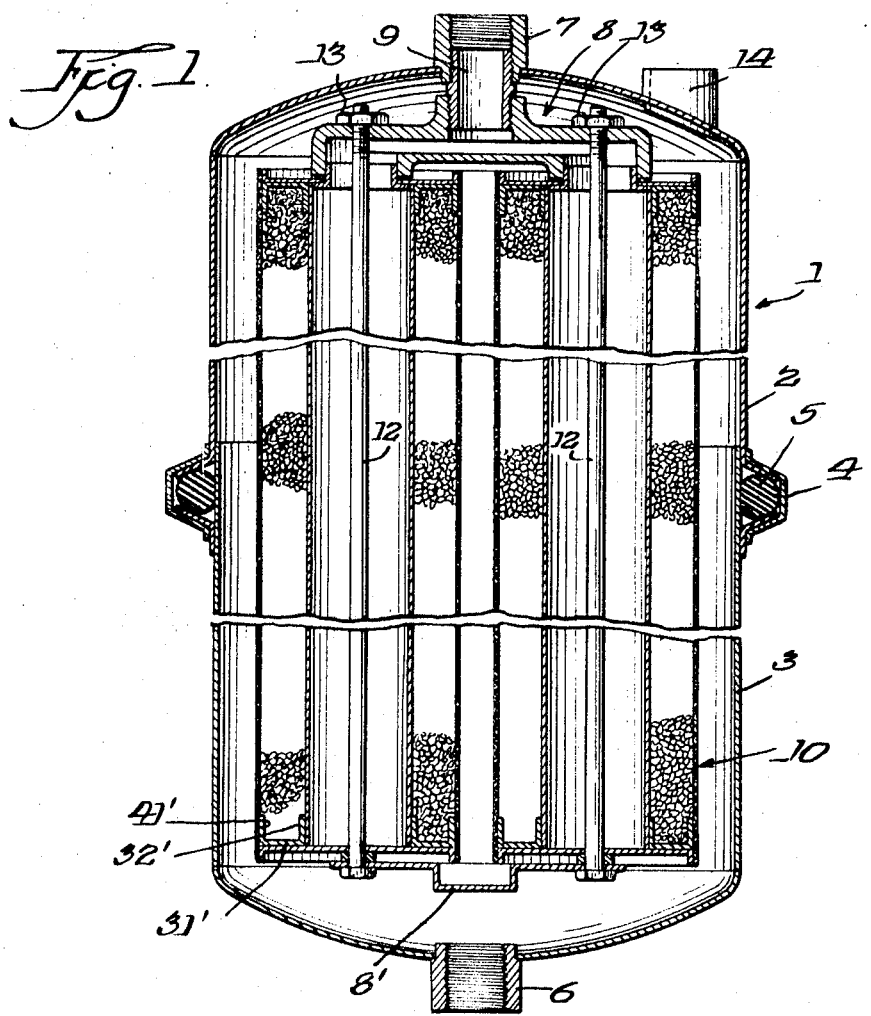
FIG. 1 is a sectional view of a filter structure embodying the invention, taken approximately on the line 1—1 of FIG. 2.

The present invention contemplates the production of a filter cell utilizing a discrete non-rigid material which forms a supporting bed for relatively fine filter aid material, the discrete supporting material being disposed within a retaining structure constructed to permit the liquid to be filtered to pass therethrough and through the supporting bed. Thus a filter aid material which is relatively fine compared with the size of the particles of the supporting material may be deposited on the latter at the inlet side of the structure to provide a highly efficient filtering medium through which the liquid may flow. The supporting structure for the supporting bed is preferably so constructed that it firmly and efficiently retains the discrete bed material in operative position, but is constructed to flexibly support such discrete material to permit a sufficient degree of movement thereof and the supporting material, under the application of backwash pressures thereto, whereby the deposited filter aid material is quickly detached and completely washed from the filter structure, following which a new coating of filter aid material may be deposited upon the supporting bed and another operating cycle effected.

In the preferred embodiment of the invention the supporting structures for the bed material, which comprises crushed and graded obsidian or quartz in suitable particle sizes, is provided with a retaining wall at its discharge side which is in the form of a perforated metal sheet, while the retaining wall for said bed material at the inlet side is in the form of a woven wire mesh, the mesh size and openings in the perforated metal screen being so selected that they are considerably larger than the size of the filter aid material particles but at least slightly less in size than the particles forming the filter bed material, whereby the latter cannot pass through the walls of the retaining structure. The invention also incorporates in such a filter cell novel means for distributing the backwash flow to insure relatively uniform and complete discharge of the filter aid material during backwashing operations, the construction enabling a very efficient backwashing with minimum amount of backwash liquid.

As will hereinafter be brought out, the comparative proportions of the filter aid and bed material as well as the openings in the retaining structure, are of considerable importance in determining the ultimate efficiency and overall operation of the structure, whereby optimum operation is achieved.

Referring to the drawings and more particularly to FIGS. 1 through 4, the reference numeral 1 indicates generally a housing illustrated as being divided into an upper and lower section 2 and 3, respectively, secured at their meeting ends by a clamp ring 4 and gasket 5. The housing is provided at its lower end with a fluid inlet fitting 6 and at its upper end with a fluid outlet fitting 7. Suitably connected to the outlet fitting is a manifold fitting indicated generally by the numeral 8, the latter being secured to the fitting 7 by a nipple 9, the manifold forming mounting means for a plurality of filter cells, indicated generally by the numeral 10, which are secured in operative position to the manifold 8 by bolts 12 and cooperable nuts 13 threaded on the upper ends thereof. In operation the liquid to be filtered is adapted to enter the housing through the inlet fitting 6, passing through the filter cells 10, manifold 8, and outlet 7.

When it is desired to backwash the filter elements, the fluid flow is reversed, the backwash liquid entering the outlet fitting 7, passing through the filter cells in reverse direction and discharged through the suitable drain outlet 14 secured to the housing, the inlet fitting 6 being closed during such operation by suitable valving or the like.

The details of the housing, as well as the manifold structure may vary widely to meet specific operational and installation conditions, as well as the number of filter cells employed.

Figure 2:
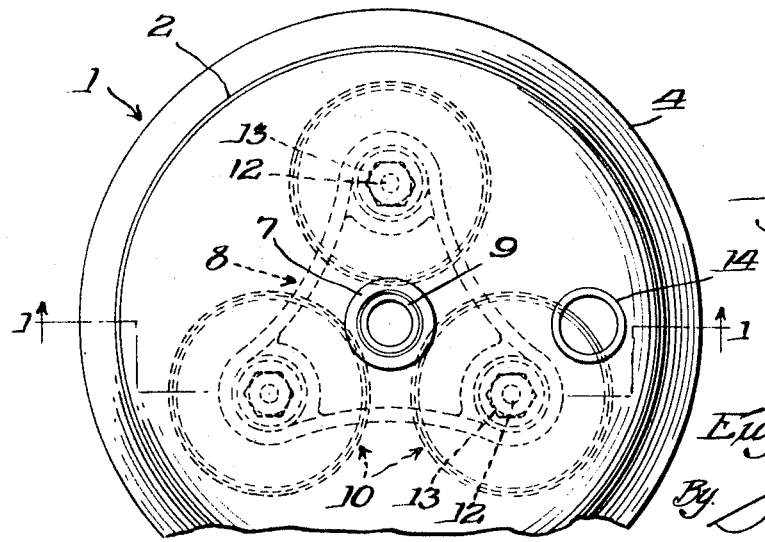
FIG. 2 is a plan view of the filter element illustrated in FIG. 1.

The particular embodiment of the invention illustrated in FIGS. 1 and 2 utilizes three filter cells 10 but it is believed apparent that any number of cells may be employed to meet desired operational requirements, and the size and shape of the cells may correspondingly vary.

Referring to FIGS. 3 and 4, the cell 10 comprises an inner screen 15 and an outer screen 16, such screens being illustrated as being of tubular shape having a circular cross section and disposed concentrically, the screen 16 forming the inlet side of the filter cell and the screen 15 the discharge side thereof. The screens are supported in concentric relation by end assemblies respectively designated generally by the reference numerals 17 and 18, the assembly 17 forming the discharge outlet for the cell and comprising an annular end cap 19 having an outwardly or axially extending peripheral flange 21 forming mounting means to which the adjacent portion of the screen 16 is suitably secured, as for example by welding or the like. The inner screen is supported at its corresponding end by an annular shaped baffle member 22 having an inwardly directed axially extending peripheral flange 22' to which the screen 15 is suitably secured and having an annular portion 23 disposed adjacent the portion 19. The outlet of the cell is formed by an adapter fitting 23 having a tubular portion 24 adapted to be operatively connected to the manifold 8, with the fitting 24 having a radially extending flange 26 from which extends an axially extending annular flange 27.

The opposite end assembly 18 is similarly constructed, having an end member 28 formed with an outwardly extending axially directed peripheral flange 29 to which the adjacent end of the screen 16 is secured. A baffle member 31 having an inwardly directed axially extending peripheral flange 32 is disposed concentrically with the member 28, the adjacent end edge of the inner screen 15 being secured to the flange 32. Disposed concentrically within the member 31 is an adapted fitting 33 having an inwardly extending axially directed flange 34 extending in opposition to the flange 27 on the fitting 23 and disposed between the flanges 27 and 34 and the screen 15 is a baffle member 35, which as illustrated in FIG. 4 is of generally annular cross section, having a plurality of relatively flat side walls 36 arranged in more or less corrugated configuration to form a generally star-shaped structure in cross-section, the inner apexes formed by the junctures of the walls 36 being disposed adjacent the flanges 27 and 34 and the outer apexes in engagement with the screen 15.

As illustrated in FIG. 6, which represents a cross section of the screen structures on a considerably magnified scale, the inner screen 15 is preferably constructed of sheet metal having perforations 37 therein, while the outer screen 16 is constructed in the form of a woven wire mesh structure having transversely extending strands which are interwoven to form a wire screen. The size of the openings in screens 15 and 16 will vary somewhat with the particular usage to which the filter is to be put, and I have found for general application, particularly water filtration operations, exceptionally efficient results may be obtained with an inner screen constructed from sheet metal such as stainless steel with a thickness of .008, having nine hundred and fifty-two holes per square inch of .020 inch in diameter, while the outer screen, constructed of stainless steel wire, is formed with 40 x 40 mesh per linear inch, the wire diameter being substantially .008 inch, providing openings in the screen which range from approximately .0164 inch to .0195 inch. The screens thus would be suitable for a filter cell employing between the inner and outer screens a non-rigid discrete material 38 which is inert and of uniform size within predetermined limits. I have found that crushed and graded obsidian or quartz is very satisfactory for use in the invention, and for most applications may range between 500 and 1600 microns in size.

In operation of the filter structure, the filter device made up of one or more of the cells illustrated in FIG. 3, as for example, three such cells as illustrated in the filter unit of FIGS. 1 and 2, are operatively interposed in the flow of the fluid to be filtered, the screen 16 forming the inlet side of the filter cell, and the screen 15 the outlet side thereof. A suitable filter aid material is admitted into the filter at the inlet side whereby such filter aid is deposited on the inlet screen 16, the particles of the filter aid material being considerably smaller than the openings in the inlet screen as well as smaller than the individual particles of the discrete non-rigid material disposed between the inner and outer screen of the filter cell, whereby such filter aid material forms a filter layer or cake 39 at the exterior of the filter cell.

While various types of filter aid material may be employed with the invention, as for example, suitable diatomaceous earth products, and other types of filter aid material, I prefer to employ a filter aid formed from volcanic glass, particularly a pure form of complex silica of alumina, suitably expanded by the application of high temperature heat and classified as to particle size, to produce a material in which each particle is extremely spicular, having a large adsorptive surface, and classified as to particle size of from 3 to 149 microns. Such material has an exceptionally large available adsorptive surface and porosity i.e. (210 grams of powder having approximate surface area equal to forty-five thousand square feet and weighing from five to ten pounds per cubic foot). Based on the true specific gravity of silica 2.2, a cubic foot of powder should weigh about one hundred and thirty-five pounds, but at an apparent density of ten pounds per cubic foot it is believed evident that substantially 93% of the apparent volume of the powder must consist of a myriad of tiny interconnected pores or voids, with corresponding large surface area and very high adsorptive capacity.

Thus assuming the use of such filter material in the filter cell of the present invention, such filter aid material when slurried into the liquid to be filtered will readily pass through the inlet screen 16 and be trapped in the voids between the particles of the discrete material 38, thus forming an effective filter layer or cake upon which the material to be filtered out of the liquid will be trapped and retained.

It will be noted that the structure of FIG. 3 comprising the inner and outer screens and discrete non-rigid material disposed therebetween merely form a supporting structure for the actual filtering medium which comprises the filter aid material 39. The construction is such that the non-rigid discrete material 38 is relatively firmly supported, whereby it will not undesirably shift during operation of the filter and will be retained within the filter cell substantially as illustrated in FIG. 3, filling the chamber formed between the inlet and outlet screens with very little, if any, settling of the material whereby an air space or void may be formed between the two screens.

When the thickness of the filter aid deposited on the inlet screen 16, following slurrying of additional filter aid material thereon, reaches a point where the back pressure has reached a maximum desirable point, the filter cell is backwashed by reverse flow of the liquid outwardly through the material 38 and screen 16 to flush the particles of the filter aid material 39 from the material 38 and the screen 16. It will be appreciated that due to the construction of the filter cell 5 the reverse liquid flow therethrough may effect a shifting of the particles of the material 38 as well as a very slight degree of flexing in the screen 16, thereby insuring that all filter aid material is readily broken up and removed without the necessity of performing other operations thereon.

In prior structures of the general type here involved it has been extremely difficult, and sometimes impossible, to completely remove the accumulated layers of filter powder and debris from the conventional fine wire cloth mesh or woven cloth covered tubes or plates, and in many cases the sludge "slimes" over and plugs the open area of the woven material, building up a back pressure to such a point that the filter elements must be disassembled and manually cleaned with steam or chemicals and subsequently reassembled. Likewise, means has heretofore been provided for mechanically sticking or tapping the tubular filter elements, but this operation not only often fails to accomplish the satisfactory removal of the filter cake but frequently results in damage to the filter structure. Likewise, mechanical scrapers have been heretofore employed in an attempt to achieve a sufficient removal of the filter cake. In the present instance it will be apparent that any agitation and shifting of the discrete material during movement of the screen 16 in effect, takes place within the filter cake and thus insures complete and efficient removal of the filter aid material.

To prevent the improper operation of the filter cell, either as a result of the creation of a space or void within the cell structure as a result of settling of the material 38 and thus possibly create a by-pass channel, as well as insure complete removal of the filter aid material throughout the effective operating area of the outer screen, the latter is provided at each end with a corresponding baffle ring 41 which extends axially substantially coextensive with the corresponding flanges 22 and 32 on the respective fittings 23 and 31, thus forming an annular chamber at each end of the filter cell which is substantially inoperative with respect to the filtering operations. A chamber is thus provided at each end of the device which may accommodate a void or space resulting from the slight settling of the material 38, and at the same time prevents the possibility of either a build-up of filter aid material at the ends of the cell which may not be removed during the backwashing operation, as well as eliminates the possibility of the creation of by-pass channels through the cell structure. The baffle structure comprising the ring 41 can also be disposed adjacent the inner face of the outer screen, which construction is generally diagrammatically illustrated in FIG. 1, wherein the baffle member 31', corresponding to the member 31 in the construction of FIG. 3, is provided with concentric flanges 32' and 41'.

I have found that when the liquid flow is reversed for backwashing operations, upon admission of the liquid in reverse flow, particularly if the length of the cells is relatively great, there is an apparent tendency for the liquid to produce surges of increased pressure on the filter cell structure adjacent the bottom end of the cell opposite to the inlet end, which surges may result in an initial localized removal of the filter cake adjacent the lower end of the filter cell, thereby creating a by-pass channel whereby the upper end of the cell is not thoroughly backwashed and the removal completely effected. To equalize the backwashing operation throughout the filtering area, the baffle member 35 is provided with a plurality of ports or openings 42 therein, which as illustrated in FIG. 3, are more or less concentrated adjacent the upper end of the filter cell as viewed in FIG. 3. The number and size of the holes 42 is such that the total flow area is adequate to accommodate the maximum flow through the filter structure but prevents undesired surges of liquid in a backwash direction adjacent the lower end of the cell and thus equalizes the backwashing action through the screen area.

The desired equalization of the backwash flow may be achieved by any suitably shaped baffle member, FIG. 5, illustrating a modified form thereof in which the baffle member 35' is of generally polygonal shape, that illustrated being in the form of a hexagonal prism having six side walls 36', the baffle member engaging the screen 15 adjacent the corners of the baffle member and engaging the flanges 27 and 34 of the members 24 and 33 at the intermediate portion of each wall 36' as will be clearly apparent from a reference to FIG. 5.

As previously mentioned, I have found that the discrete non-rigid material 38 preferably is graded between 500 to 1600 microns, and I have found that for optimum operation the effective size and uniformity coefficient of the material are important factors. The "effective size" in the non-rigid filter media is determined by the size of screen opening whereby 90% by weight of the material is retained on the screen and 10% passes through the screen, while the "uniformity coefficient" is the ratio of the size of the screen opening which will pass 60% of the non-rigid filter media to the effective size (the opening passing 10% of the media). The smaller this coefficient, naturally the more uniform the media. If all the grains of non-rigid media were exactly the same size (which would be undesirable), the coefficient would be 1. This is illustrated in the chart of FIG. 7 which illustrates the curve for a very efficient filter supporting media, and from which it will be noted that the minimum particle size is 500 microns, the maximum size being less than 1410 microns, 60% being less than 848 microns and 10% less than 628 microns. The effective size thus is 628 microns and the coefficient is .848 over .628 or 1.34.

It will be apparent from the above disclosure that I have provided a filter cell which has extremely large filtering capacity per square inch of filter area, and thus requiring very little bulk and space compared with previous types, and at the same time has exceptionally high filtering efficiency, which is achieved without the use of any chemical coagulant or pH adjustment reagents and which permits efficient backwashing with very small amounts of backwash water. At the same time the filter cycle is considerably increased without material loss in efficiency, enabling the practical and economical operation of the filter to continue until the head pressure reaches forty pounds or higher.

Having thus described my invention, it is obvious that various immaterial modifications may be made in the same, without departing from the spirit of my invention; hence I do not wish to be understood as limiting myself to the exact form, arrangement or combination of parts herein shown or described, or uses mentioned.

I claim as my invention:

1. A filter cell for supporting filter material in operative filtering positions comprising a retaining structure having a pair of self-supporting form-retaining spaced walls, forming a chamber of relatively fixed volume therebetween, one wall of said pair forming a fluid discharge wall and the other of said pair forming a fluid inlet wall, the latter wall being relatively flexible, and the first-mentioned wall being relatively rigid, each of said walls having a plurality of defined openings therein for the passage of fluid therethrough, a non-rigid discrete material disposed in said chamber, the particle sizes of such material being larger than the openings in either of said walls, said retaining structure being operative to retain said discrete material in operative position but permitting a slight movement of said material under backwash conditions, and a filter material, having particle sizes less than the size of the openings in said inlet wall disposed directly upon and supported by said discrete material.

2. A filter cell as defined in claim 1, comprising means disposed adjacent said relatively rigid wall forming a liquid distribution manifold during backwashing operations whereby the backwash operation is relatively uniform throughout the effective filter area.

3. A filter cell as defined in claim 2, wherein said manifolding means is engaged with said relatively rigid wall and forms reinforcing means therefor.

4. A filter cell as defined in claim 1, wherein said relatively rigid wall comprises a perforated sheet metal screen, and said relatively flexible wall comprises a woven metal mesh screen.

5. A filter cell as defined in claim 4, for filter aid material comprising particles having a size of from 3 to 149 microns wherein said inner screen comprises a stainless steel sheet of perforated metal of approximately .008" in thickness, having approximately 950 holes per sq. in. therein, each of which is approximately .02" in diameter, said outer screen comprising a woven stainless steel wire screen of 40 x 40 mesh per linear inch, with a wire diameter of .008" and providing openings of from .0164" to .0195" for the retention of said discrete material.

6. A filter cell as defined in claim 1, wherein said filter material comprises particles having a size of from 3 to 149 microns.

7. A filter cell as defined in claim 6, wherein said particles of discrete material have a minimum size of between 500 and 1600 microns and the openings in the respective walls is less than the corresponding size of the smallest particles.

8. A filter cell comprising a pair of end members, a pair of spaced annular shaped wall members extending between said end members concentrically disposed about an axis to form a tubular shaped space therebetween, an opening formed in one of said end members forming a fluid port for the entry and discharge of fluid to and from the cell interior, said wall members having openings therein for the passage of fluid therethrough, and a member extending coextensively with the effective area of the inner wall, and having portions spaced from the latter, said member having openings therein and forming a manifold for effecting a distribution of liquid from the interior of said cell to the adjacent wall member, the openings in said manifold member being arranged to provide greater fluid passage area adjacent the end thereof adjacent said fluid port than at the end opposite said fluid port.

9. A filter cell as defined in claim 8, comprising baffle means disposed adjacent the outer of said annular-shaped wall members at each end thereof.

10. In a filter cell, the combination of a filter aid material, non-rigid discrete material forming a direct supporting bed for said filter aid material, a retaining structure of said discrete material, constructed to permit liquid flow through the latter, said retaining structure having a self-supporting form-retaining non-rigid wall at the fluid inlet side thereof and a second wall at the outlet side, said non-rigid wall having defined openings therein greater in size than the particles of said filter aid material, said retaining structure being operative to retain said discrete material in operative position with said filter aid material disposed directly thereon but permitting relatively slight movement of said discrete material, sufficient under backwash conditions to insure substantially complete disengagement and removal of filter aid material from said discrete material by such backwash.

11. A filter cell, as defined in claim 10, for filter aid material comprising particles having a size from 3 to 149 microns, wherein said discrete material comprises crushed and graded obsidian, having a particle size of between 500 and 1600 microns.

12. A filter cell as defined in claim 10, wherein said non-rigid wall comprises a wire mesh, and the wall at the outlet side of said cell comprises perforated sheet metal.

13. A filter cell, as defined in claim 10, wherein said discrete material has a uniformity coefficient of between 1.30 and 1.65.

14. In a filter cell wherein filter aid material is supported in operative filtering position directly on a non-rigid discrete material, the particles of which are greater in size than the particles of such filter aid material, the improvement comprising, a retaining structure forming a chamber of substantially fixed volume, which is completely filled by said discrete material, said retaining structure being constructed to permit liquid flow therethrough and operative to retain said discrete material in operative position for directly supporting such filter aid material in operative filtering position thereon, said retaining structure having self-supporting, form-retaining walls at the fluid inlet and outlet sides thereof having defined openings therein which are smaller in size than the particles of said discrete material and greater in size than the particles of said filter aid material, said wall being constructed to permit a slight flexing thereof under backwash conditions, sufficient to insure substantially complete removal of filter aid material from the interstices of the bed of discrete material by such backwash, but insufficient to impair the operative support of filter aid material subsequently disposed thereon.

References Cited

UNITED STATES PATENTS

| | | | |
|---|---|---|---|
| 2,181,608 | 11/1939 | Russell et al. | 210—283 |
| 2,617,986 | 11/1952 | Miller | 210—247 X |
| 2,732,984 | 1/1956 | Koupal et al. | 210—356 X |
| 2,846,074 | 8/1958 | Brundage | 210—457 |
| 2,946,446 | 7/1960 | Howard | 210—323 |

SAMIH N. ZAHARNA, Primary Examiner

U.S. Cl. X.R.

210—457, 497